(12) United States Patent
Fisk

(10) Patent No.: US 8,910,385 B2
(45) Date of Patent: Dec. 16, 2014

(54) METHOD OF FORMING A BEARING DEVICE

(75) Inventor: Richard W. Fisk, London (GB)

(73) Assignee: NSK Europe Co., Ltd., Nottinghamshire (GB)

( * ) Notice: Subject to any disclaimer, the term of this patent is extended or adjusted under 35 U.S.C. 154(b) by 2050 days.

(21) Appl. No.: 11/691,827

(22) Filed: Mar. 27, 2007

(65) Prior Publication Data

US 2007/0193033 A1 Aug. 23, 2007

Related U.S. Application Data

(60) Division of application No. 11/367,215, filed on Mar. 2, 2006, now Pat. No. 7,246,948, which is a continuation of application No. PCT/GB2004/003778, filed on Sep. 3, 2004.

(30) Foreign Application Priority Data

Sep. 3, 2003 (GB) .................................. 0320650.5

(51) Int. Cl.
*B23P 17/00* (2006.01)

(52) U.S. Cl.
USPC ...................... 29/898.07; 29/525.11; 384/542

(58) Field of Classification Search
CPC ..... F16C 35/067; F16C 35/077; B25B 27/06; B25B 21/00; B23B 41/00; B23P 15/00
USPC .............. 29/898, 898.07, 428, 462, 464, 465, 29/505, 521, 522.1, 525.01, 525.02, 29/525.11, 898.09; 384/537, 542, 903
See application file for complete search history.

(56) References Cited

U.S. PATENT DOCUMENTS

| 1,392,432 A | 10/1921 | Miles |
| 1,675,910 A | 7/1928 | Riker |

(Continued)

FOREIGN PATENT DOCUMENTS

| CH | 639295 | 11/1983 |
| CN | 2491649 Y | 5/2002 |

(Continued)

OTHER PUBLICATIONS

Machine Translation of DE 10137296A1, Feb. 13, 2003.*

(Continued)

*Primary Examiner* — David Bryant
*Assistant Examiner* — Ryan J Walters
(74) *Attorney, Agent, or Firm* — Ditthavong & Steiner, P.C.

(57) ABSTRACT

A bearing assembly is disclosed which addresses the problem of axially retaining a bearing journaled onto a shaft within a casing in an axially compact and technically economic and reliable way by first mounting a retaining plate (6) onto an outer race of the bearing (1). The mounting can be achieved by press fitting onto a shoulder so that the retaining plate can rotate relative to the outer race. The bearing is then journaled onto a shaft (4) and inserted into a compact casing (3) so that the outer race is guided into a housing (2) formed in an end wall of the casing (3). The retaining plate can then be rotated as required to align fastening bosses (7) with holes (8) to be engaged by screws (9) so that the retaining plate us urged axially against the outer race.

17 Claims, 3 Drawing Sheets

(56) References Cited

U.S. PATENT DOCUMENTS

| | | | |
|---|---|---|---|
| 2,277,635 A | | 3/1942 | Delaval-Crow |
| 2,368,549 A | | 1/1945 | Kendall |
| 3,365,997 A | | 1/1968 | Price |
| 5,168,740 A | | 12/1992 | Griesemer |
| 5,406,600 A | * | 4/1995 | Jones et al. .................... 376/272 |
| 5,492,001 A | * | 2/1996 | Sasaki et al. .................... 72/359 |
| 6,647,839 B2 | * | 11/2003 | Yoshitome et al. ............ 82/1.11 |
| 2002/0139164 A1 | * | 10/2002 | Ishihara ......................... 72/326 |

FOREIGN PATENT DOCUMENTS

| | | | | |
|---|---|---|---|---|
| DE | 3843890 | C1 | | 3/1990 |
| DE | 19957709 | | | 6/2000 |
| DE | 20019278 | | | 4/2001 |
| DE | 20019278 | U1 | | 4/2001 |
| DE | 10137296 | | | 2/2003 |
| DE | 10137296 | A1 | | 2/2003 |
| DE | 10153441 | | | 5/2003 |
| EP | 1265339 | A1 | | 12/2002 |
| JP | 61-103013 | A | | 5/1986 |
| JP | 1-60024 | A | | 4/1989 |
| JP | 1-180728 | A | | 7/1989 |
| JP | 2-140017 | U | | 11/1990 |
| JP | 3-117116 | U | | 12/1991 |
| JP | 2001050291 | A | * | 2/2001 |
| JP | 2002-2209 | A | | 1/2002 |
| JP | 2002-369442 | A | | 12/2002 |
| JP | 2003-139151 | A | | 5/2003 |

OTHER PUBLICATIONS

Machine Translation of DE20019278U, company: SKF, no inventor named, May 10, 2001.*
Examination Report for GB0320650.5, May 25, 2006.
Japanese Office Action for JP 2006-525183, Jun. 22, 2010.
European Search Report for EP 10 00 7216, Mar. 26, 2012.
Examination Report for Divisional JP 2010-131390, Jul. 31, 2012.

* cited by examiner

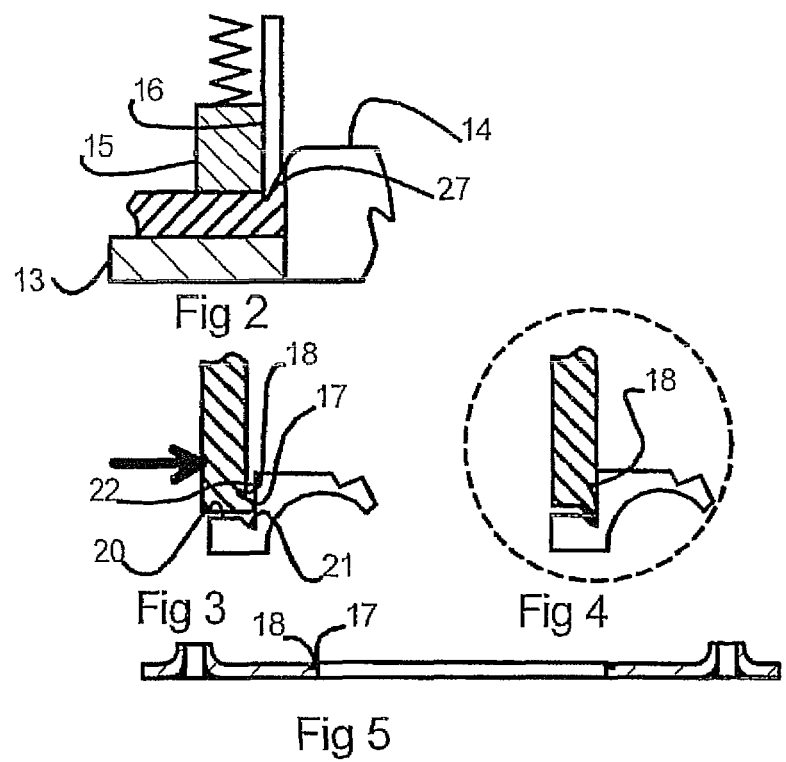
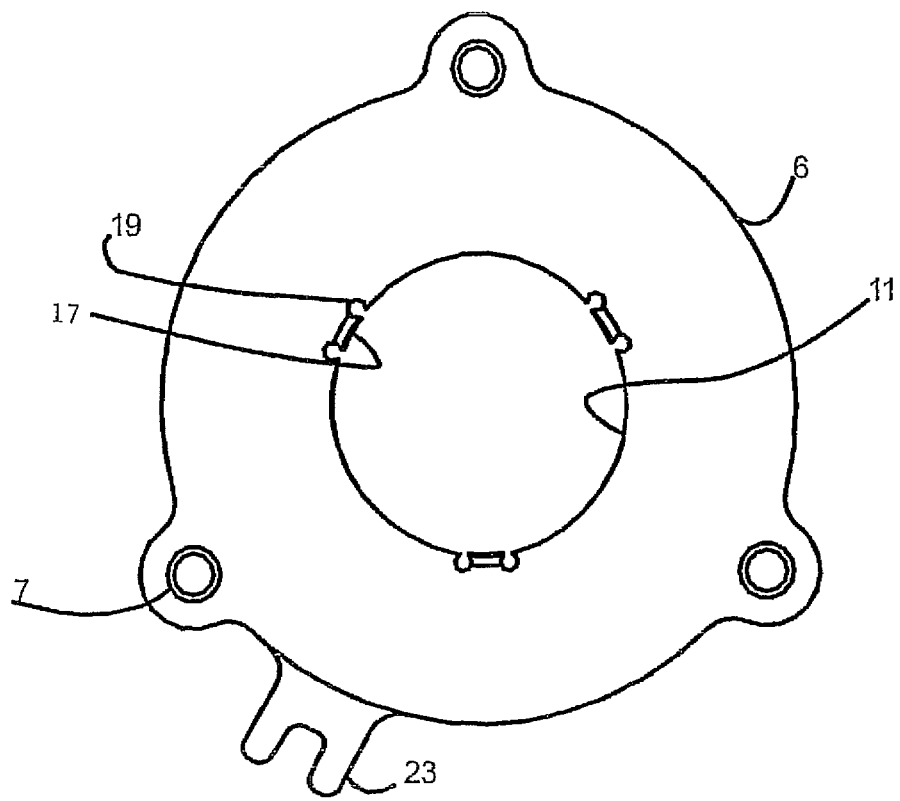

METHOD OF FORMING A BEARING DEVICE

PRIORITY INFORMATION

This application is a divisional of U.S. patent application Ser. No. 11/367,215, filed on Mar. 2, 2006, now U.S. Pat. No. 7,246,948 which claims benefit of International Patent Application No. PCT/GB2004/003778, filed on Sep. 3, 2004 and claims priority to Great Britain Patent Application No. 0320650.5, filed on Sep. 2, 2003, all of which are incorporated by reference in their entirety.

BACKGROUND OF THE INVENTION

The present invention is concerned with the form of and a method of forming a bearing assembly particularly adapted for use where the bearing is subject to axial loads, in very compact machine assemblies without fastening tool access to the bearing housing and where robot machine assembly is desirable.

The present invention arose in addressing the problem of assembling a bearing into compact vehicular gear box housing where the bearing is journaled onto a gear shaft of the gear box together with a number of other components such as gears. It will hereafter be described in that context but unless otherwise stated the invention may have applications in many other similar structures. In such a gear box the gear shaft is journaled onto a bearing and the bearing received into a bearing housing formed in the gear box casing. The fitting of the outer is typically an engineering interference fit or similar means of location such that the outer is not free to take up a different angular orientation. In operation the shaft is subject to axial forces which urge the bearing out of its housing in each axial direction. The forces directed axially out of the casing are resisted by a shoulder formed in the casing. However a retaining means must act between the outer race of the bearing and the casing to prevent axial displacement in the opposite direction. An example of conventional means may be a circlip received into a groove formed in the wall of the bearing housing. However, the installation of such retaining means requires access by a tool to the inside of the casing and is difficult to implement robotically. Further the use of circlips and like devices requires a loose fit between the bearing outer and the circlip which undesirably permits axial movement of the bearing and occupies space in the axial direction. Also, circlips and similar devices are not easy to disassemble without good tool access. If such access requirement can be obviated robot assembly will be possible and the bulk of the gear box can be reduced with numerous advantages which will be apparent to the skilled person.

Also known in the prior art is EP1265339 which discloses a bearing assembly in a motor. A retaining plate is first mounted temporarily onto a shaft. A bearing is then journaled onto the shaft. The assembled retaining plate and bearing are then inserted into the motor casing with the outer race of the bearing being inserted into a bearing housing. This presents a problem in that the retaining plate must be dismounted from the shaft before operation. Further the retaining plate cannot be arranged to sit flush with the inner end of the bearing so that the axial length of the bearing and housing assembly is not minimized.

SUMMARY OF THE INVENTION

Accordingly to alleviate these problems the present invention provides a bearing assembly comprising: a bearing assembly comprising: a bearing having an outer race for reception in a bearing housing formed in a casing and an inner race to be journaled onto a shaft, and a retaining plate mounted onto the outer race before assembly into the bearing housing or onto the shaft and provided with fastening means to cooperate with fastening means provided in or on a wall of the casing opposing the retaining plate.

The retaining plate may be irrotatably fastened for some applications, for example by press fitting. However, in the preferred embodiment of the invention the retaining plate is fastened so as to rotate with respect to the outer race thus providing for convenient alignment of the fastening means after the outer race is irrotatably retained in the housing.

Further according to the present invention there is provided a method of forming a bearing assembly comprising the steps of:

mounting a retaining plate on an outer race of a bearing whereby when the bearing is seated in a bearing housing it is axially retained by the retaining plate which is secured by fastening means acting between a casing in which the bearing housing is formed and the retaining plate.

According to another aspect of the present invention there is provided a method of forming a boss in a plate to be subject to cyclic fatigue loads in use comprising, selecting the material of the plate to have a high strain hardening coefficient in excess of 0.35, and press forming the boss against a die such that the radius of curvature of the region between the original plate and the wall of the boss complies with the formula:

$$\text{radius} = \text{plate thickness} \times A$$

where "A" has a value between 0.3 and 0.7 such that the arcuate portion of the boss work hardens under load to produce a region having a high local tensile strength.

BRIEF DESCRIPTION OF THE DRAWINGS

The bearing assembly of the present invention alleviates the problems discussed above as will be apparent from the following non limiting detailed description of one embodiment of the bearing assembly and method of forming a bearing assembly which refers to the figures described briefly as follows:

FIG. 2 is an enlarged sectional elevation through a die punch showing the formation of a clinching lip (17) on a retaining plate of the assembly, FIG. 3 is an enlarged sectional view through a shoulder of a bearing as the retaining plate is mounted on it, FIG. 4 is an enlarged sectional view showing the engagement of the clinching lip (17) with the groove in the retaining plate, FIG. 5 is a sectional view through the retaining plate alone and, FIG. 6 is a plan view of the retaining plate.

DESCRIPTION OF THE INVENTION

Figure 1:
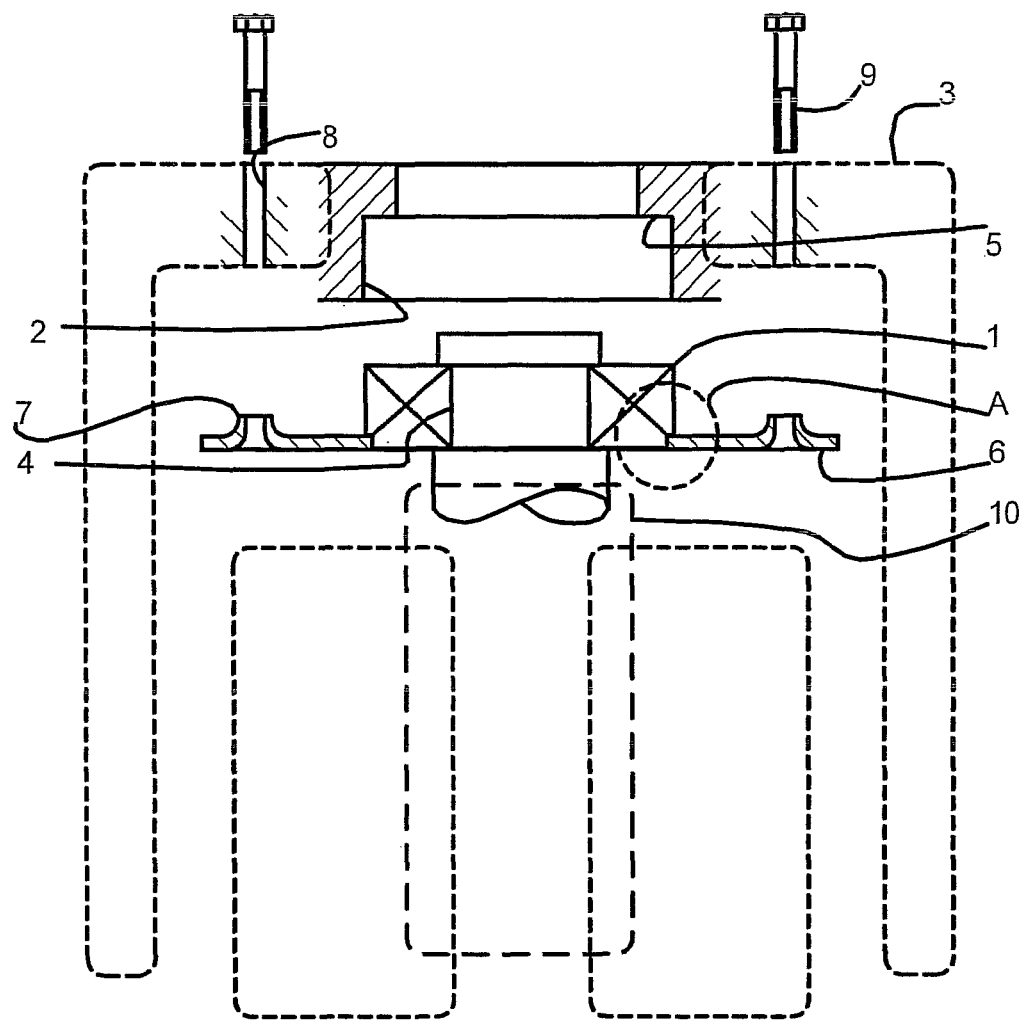
FIG. 1 is a sectional elevation through a gear box casing showing the bearing assembly during installation in a bearing housing formed in the casing.

Referring to the drawings, FIG. 1 shows a bearing assembly comprising, a bearing 1 having an outer race for reception in a bearing housing 2 formed in a casing 3 for a vehicular gear box. The inner race of the bearing 1 is journaled onto a shaft 4. The bearing 1 is to be received into the bearing housing 2 so that it abuts a shoulder 5 formed in the housing to prevent displacement of the bearing in the axial direction (with respect to the shaft) out of the casing 3. To prevent the bearing 1 being displaced in the opposite axial direction a retaining plate 6 is mounted for rotation with respect to the outer race of the bearing 1. When the bearing 1 is seated in the housing, fastening means provided by threaded bosses 7, formed in the retaining plate 6, are aligned with through holes 8 formed through the casing 3 so that screws 9 can be driven through the holes to engage in the bosses 7 and retain the retaining plate 6. The bearing assembly can therefore be installed where the components are mounted on the shaft in such close proximity to the retaining plate as to prevent the operation of the tools between the retaining plate and the components and where the casing surrounds the bearing shaft, components and retaining plate to the extent that a fastening tool cannot operate on the retaining plate. This in turn allows further components such as gears 10 to be assembled on to the shaft in very close proximity to the bearing 1 before the bearing assembly and shaft is installed.

The retaining plate 6 is folioed from metal strip by first punching out the bosses 7. A centre hole 11 is then punched out. A plurality of clinching lips 17 are then formed along arcs spaced around the circular inside edge of the retaining plate 6. In the present example three lips 17 are formed, however, according to specific requirements two to five lips 17 may be formed.

FIG. 2 shows the use of a specially designed punch tool to form the clinching lip 17. The hole 11 is located on a die plate 13 surrounding a circular guide 14. A platen ring 15 is then pressed against the exposed surface of the plate before a coining punch 16 is driven part way into the surface of the retaining plate spaced a small distance from the edge of the hole. The coining punch has a wedge shaped blade 27 which engages in the surface of the retaining plate to plastically deform the edge of the plate so forming a lip 17 on the edge which projects up, i.e. in the axial direction, from the surface of the retaining plate and leaves a groove 18 along its edge remote from the hole. The coining punch may also form notches 19 at each end of the arc to control the deformation at each end. Each arc deformed by the coining punch extends over between 12 and 36 degrees of arc so that the total part of the edge deformed is between 10% and 30%.

A shoulder 20 is formed on the edge of the outer bearing race of the bearing 1. A triangular shaped groove 21 is formed in the shoulder 20 adjacent the axial face 22 formed with the shoulder. In the present example the groove is of the order of 0.3-0.4 mm deep and the clinching lip 17 is of a similar height. The hole in the retaining plate is made oversize in relation to the diameter of the shoulder 21.

To secure the retaining plate 6 to the bearing 1 the retaining plate is located over the bearing with the clinching lip 17 engaging the axial face 22. It may be noted that the fit of the hole 11 over the shoulder 20 is loose as indicated by the exaggerated gap shown in FIGS. 3 and 4. An assembly force is then applied in the direction of the arrow in FIG. 3 which plastically deforms the clinching lip 17 causing it to engage in the groove 21 as shown in FIG. 4.

The retaining plate 6 also provides a retaining element in the form of a "U" shaped bracket 23 projecting from an outer periphery of the plate. The Forks of the "U" shaped plate engage a gear change support rod (not shown).

It is undesirable that the plate gauge should be any greater than necessary in order to minimize the space occupied by the retaining plate. It is essential that the bearing is retained with minimal movement so that the fastening means need to provide the retaining plate with a clamping action against the axial face of the bearing. It is furthermore the case that the retaining plate is subject to cyclic axial loads during operation which present a metal fatigue problem. Conventionally punch forming the bosses onto the plate exacerbates the metal fatigue problem by work hardening the plate so that punch forming the bosses is contraindicated. However, punch forming presents substantial economies by comparison with alternative conventional solutions to the formation of fastening means. It is a further problem with punch forming the bosses to ensure that the end faces of the bosses are exactly flat.

In order to enable punch forming of the bosses the plate may conveniently be formed from a material having a high strain hardening coefficient. Preferred examples are austenitic stainless steel grade 304 and plain carbon steel grades 1020-1040. An alternative approach is to select a highly formable material and after formation of the bosses to subject it to further processes such as surface hardening or the Nitrotec process to improve its fatigue tolerance.

Figure 7A:
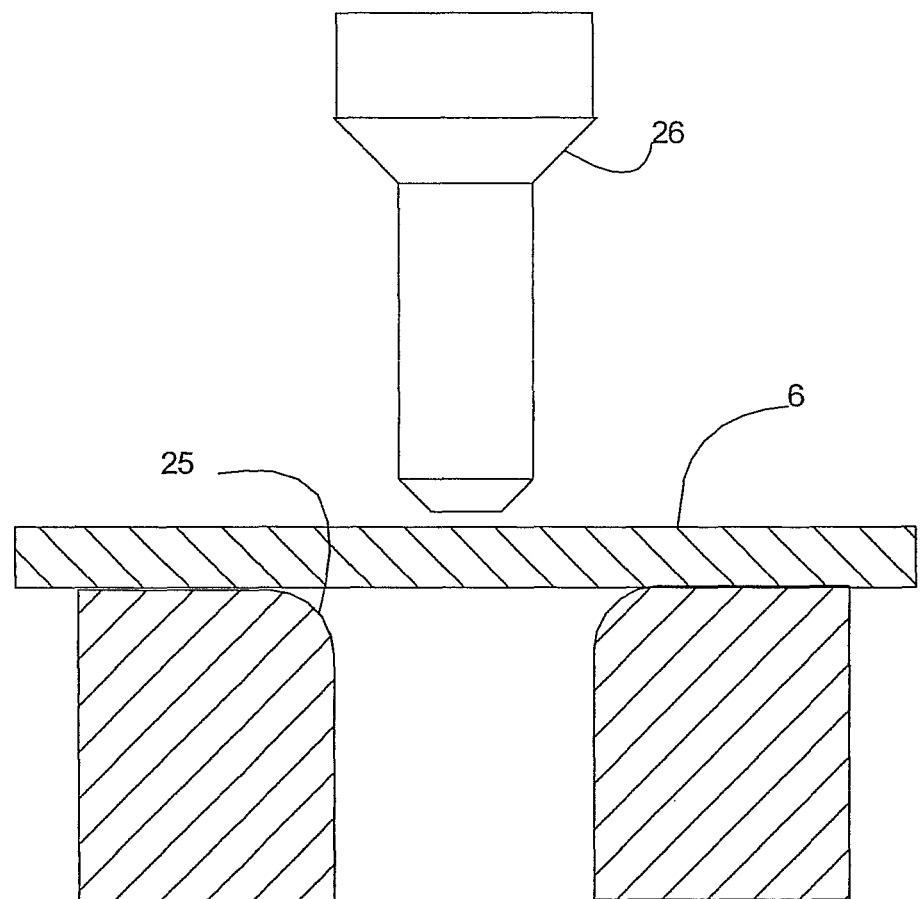
FIGS. 7A and 7B show the formation of a boss in the retaining plate.
Figure 7B:
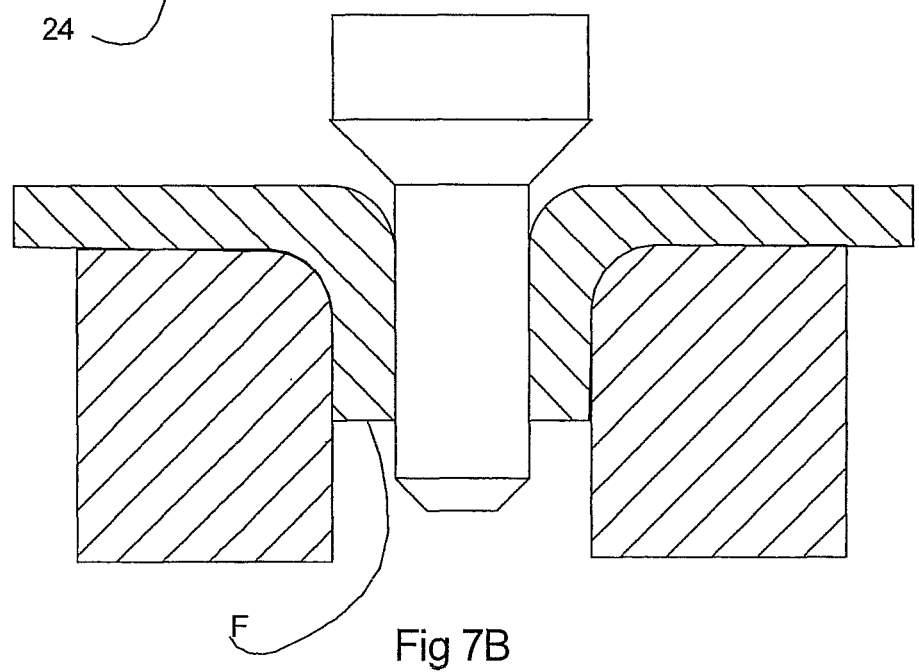

FIGS. 7A and 7B illustrate the tooling designed for formation of the bosses. The tooling comprises a die 24 having an arcuate rim 25. The radius of the arc must be carefully formed to prevent necking in the restraining plate 6. The radius of the arc is preferably formed in compliance with the formula:

$$radius = plate\ thickness \times A$$

where "A" has a value between 0.3 and 0.7.

A punch tool 26 is specially shaped to ensure that in cooperation with the die the end face "F" of the boss 7 is flat and square.

Although the example described uses screws to fasten the plate the use of other fastening means such as rivets is envisaged as within the scope of the invention.

The invention claimed is:

1. A method of forming a bearing assembly comprising the steps of:
    first mounting a retaining plate on an outer race of a bearing whereby, when the bearing is subsequently seated in a bearing housing formed in an inside of a casing the bearing is axially retained by the retaining plate which is secured to a wall of the casing by fastening means of the retaining plate; the securing step comprising driving fastenings from an outside of the casing through the wall of the casing so as to engage with the fastening means formed in the retaining plate,
    wherein the retaining plate includes a hole extending therethrough that is configured to receive the outer race of the bearing, and a plurality of lips formed around an inside edge of the hole;
    wherein the plurality of lips each have a thickness that is less than a thickness of remaining portions of the inside edge of the hole of the retaining plate; and
    wherein the retaining plate is mounted onto the outer race to rotate relative to the outer race.

2. The method according to claim 1, comprising the steps of:
    forming a shoulder on an outer edge of the outer race of the bearing,
    forming a groove in the shoulder,
    forming the retaining plate by punching the hole in strip material,
    punching with a coining punch onto the retaining plate in an arc around the hole to form a plurality of clinching lips that extend in a direction parallel to an axis of the hole,
    locating the hole of the retaining plate over the shoulder, and
    pressing the retaining plate axially against the shoulder of the outer race to deform the plurality of clinching lips to form the plurality of lips that extend in a radial direction with respect to the axis of the hole to engage the groove.

3. The method according to claim 2, wherein the plurality of clinching lips are formed around arcs extending in total between about 10% and 30% around a circumference of the hole.

4. The method according to claim 1, wherein the fastening means is formed by punching a plurality of bosses around the hole in the retaining plate.

5. The method according to claim 4,
wherein a radius of curvature formed between a body of the retaining plate and a boss of the plurality of bosses complies with the formula:

$$\text{radius of curvature} = \text{plate thickness} \times A$$

where "A" is a value between 0.3 and 0.7, and
wherein a material from which the retaining plate is formed has a high strain hardening coefficient exceeding 0.35 such that an arcuate portion of the boss work hardens under load to produce a region having a high local tensile strength.

6. The method according to claim 1, wherein a material from which the retaining plate is formed is selected from Austentitic stainless steel grade 304.

7. The method according to claim 1, wherein the fastenings are screws.

8. A method of forming a bearing assembly, said method comprising:
mounting a retaining plate on an outer race of a bearing that is configured to be seated in a bearing housing formed in an inside of a casing; and
axially securing the bearing in the bearing housing by fastening the retaining plate to a wall of the casing,
wherein the retaining plate includes a hole extending therethrough that is configured to receive the outer race of the bearing, and a plurality of lips formed around an inside edge of the hole,
wherein the plurality of lips each have a thickness that is less than a thickness of remaining portions of the inside edge of the hole of the retaining plate, and
wherein, when the retaining plate is mounted onto the outer race, the retaining plate can rotate relative to the outer race.

9. The method according to claim 8, wherein the plurality of lips are provided for mounting the retaining plate on the outer race of the bearing.

10. The method according to claim 8, further comprising:
forming a shoulder on an outer edge of the outer race of the bearing;
forming a groove in the shoulder;
forming the retaining plate by punching the hole in strip material;
punching with a coining punch onto the retaining plate in an arc around the hole to form a plurality of clinching lips that extend in a direction parallel to an axis of the hole;
locating the hole of the retaining plate over the shoulder; and
pressing the retaining plate axially against the shoulder of the outer race to deform the plurality of clinching lips to form the plurality of lips that extend in a radial direction with respect to the axis of the hole to engage the groove.

11. The method according to claim 10, wherein the plurality of clinching lips are formed around arcs extending in total between about 10% and 30% around a circumference of the hole.

12. The method according to claim 8, wherein the retaining plate is fastened to the wall by fasteners extending from an outside of the casing through the wall of the casing so as to engage with respective bosses formed in the retaining plate.

13. The method according to claim 12, wherein the fasteners are screws.

14. The method according to claim 12, wherein the bosses are formed in the retaining plate by punching.

15. The method according to claim 14,
wherein a radius of curvature formed between a body of the retaining plate and one of the bosses complies with the formula:

$$\text{radius of curvature} = \text{plate thickness} \times A$$

where "A" is a value between 0.3 and 0.7, and
wherein a material from which the retaining plate is formed has a high strain hardening coefficient exceeding 0.35 such that an arcuate portion of the boss work hardens under load to produce a region having a high local tensile strength.

16. The method according to claim 8, wherein a material from which the retaining plate is formed is selected from Austentitic stainless steel grade 304.

17. A method of forming a bearing assembly, said method comprising:
mounting a retaining plate on an outer race of a bearing that is configured to be seated in a bearing housing formed in an inside of a casing; and
axially securing the bearing in the bearing housing by fastening the retaining plate to a wall of the casing,
wherein the retaining plate includes a hole extending therethrough that is configured to receive the outer race of the bearing, and a plurality of lips formed around an inside edge of the hole,
wherein the plurality of lips each have a thickness that is less than a thickness of remaining portions of the inside edge of the hole of the retaining plate, and
wherein the plurality of lips include a first surface that is coplanar with a second surface of the retaining plate, the first surface abuts a third surface of the outer race of the bearing when the retaining plate is mounted to the outer race of the bearing.

\* \* \* \* \*